United States Patent
Borg et al.

(10) Patent No.: US 7,197,743 B2
(45) Date of Patent: Mar. 27, 2007

(54) METHOD FOR GENERATING COMPUTER SOFTWARE FOR EMBEDDED SYSTEMS

(75) Inventors: Jonathan Borg, Livonia, MI (US); George Saikalis, West Bloomfield, MI (US); Donald James McCune, Farmington Hills, MI (US); Liang Shao, Ann Arbor, MI (US); Shigeru Oho, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 660 days.

(21) Appl. No.: 10/379,205

(22) Filed: Mar. 4, 2003

(65) Prior Publication Data

US 2004/0177345 A1   Sep. 9, 2004

(51) Int. Cl.
*G06F 9/44* (2006.01)
(52) U.S. Cl. .................. 717/120; 717/106; 717/109
(58) Field of Classification Search ............... 717/109, 717/106, 113
See application file for complete search history.

(56) References Cited

U.S. PATENT DOCUMENTS

| | | | |
|---|---|---|---|
| 4,084,235 A * | 4/1978 | Hirtle et al. .................. 703/26 |
| 5,133,045 A * | 7/1992 | Gaither et al. ............... 706/46 |
| 5,524,244 A | 6/1996 | Robinson et al. ........... 395/700 |
| 5,612,866 A * | 3/1997 | Savanyo et al. .............. 700/86 |
| 5,937,188 A * | 8/1999 | Freeman ..................... 717/104 |
| 5,999,729 A | 12/1999 | Tabloski, Jr. et al. ....... 395/701 |
| 6,161,211 A | 12/2000 | Southgate .................... 716/1 |
| 6,173,438 B1 * | 1/2001 | Kodosky et al. ............ 717/109 |
| 6,286,134 B1 * | 9/2001 | Click et al. ................. 717/138 |
| 6,934,947 B1 * | 8/2005 | Zeidman ..................... 718/100 |
| 2003/0028579 A1 * | 2/2003 | Kulkarni et al. ............ 709/100 |
| 2004/0032433 A1 * | 2/2004 | Kodosky et al. ............ 345/810 |

FOREIGN PATENT DOCUMENTS

FR    2818401    6/2002

* cited by examiner

*Primary Examiner*—Wei Zhen
*Assistant Examiner*—Philip Wang
(74) *Attorney, Agent, or Firm*—Gifford, Krass, Sprinkle, Anderson & Citkowski, P.C.

(57) ABSTRACT

A method for generating computer software for a microprocessor in an embedded system in which the system includes an input/output system (BIOS), at least one input/output channel, an application layer having at least one code module which processes input/output signals from its associated channel in the BIOS, and an operating system which schedules execution of events in the application layer. A graphical user interface (GUI) is used to select channels of the BIOS by functionality, program code modules in the application layer to process the input/output signals from the BIOS and to schedule event processing in the operating system.

23 Claims, 7 Drawing Sheets

METHOD FOR GENERATING COMPUTER SOFTWARE FOR EMBEDDED SYSTEMS

BACKGROUND OF THE INVENTION

I. Field of the Invention

The present invention provides a method for generating computer software for microprocessors used in embedded systems.

II. Description of Related Art

The use of microprocessors in embedded, i.e. dedicated, systems has become increasingly prevalent as the cost of such microprocessors and their associated components decreases coupled with an increase of computing capability of such microprocessors. For example, such microprocessors are frequently used in the fuel management systems for automotive vehicles, as well as many other applications.

The exact configuration of embedded systems will vary not only between different systems involving different applications, but also between the different types of microprocessors employed in such systems. However, despite the large variation not only in the types of different systems as well as the different types of microprocessors, all embedded systems share certain characteristics.

More specifically, all microprocessors in embedded systems include a basic input/output system (BIOS) having one or more input/output channels. Each channel is capable of sending and/or receiving data from an exterior device using basic input/output protocol. For example, assuming that the embedded system consists of a fuel management system for an automotive engine, the BIOS for the microprocessor may receive data from a mass airflow sensor, temperature sensor and the like. Furthermore, this data may be in any of several protocols, e.g. pulse width modulation, serial data, parallel data, etc. Typically, each channel of the microprocessor is dedicated to one external device and typically the microprocessor includes multiple channels to control and/or receive input signals from multiple external devices.

The software for embedded microprocessor systems also includes an application layer which processes the input/output signals from the BIOS. For example, assuming that the embedded system consists of a fuel management system for an internal combustion engine, the application layer would receive input signals from the BIOS representative of, for example, the output signals from a mass airflow sensor, temperature sensor and the like. The application layer would then process these input/output signals in the desired fashion to achieve the desired end function, i.e. the fuel management control for the engine.

For example, the application layer may receive input signals from the BIOS representative of the output from a mass airflow sensor, temperature sensor, as well as other sensors. The operating system, utilizing the input signals from the BIOS, would then calculate a desired throttle position to achieve a desired result such as fuel economy, lower emissions, better engine performance, etc. Having determined that value for the throttle position, the application layer would then, through a channel in the BIOS, generate output signals to an electronically controlled throttle in order to move the throttle to the desired position.

Typically in an embedded system such as a fuel management system for an internal combustion engine, the application layer includes a plurality of different code modules wherein each code module processes different types of signals or inputs depending upon the type of external sensors or devices controlled by the microprocessor as well as the protocol used by those sensors or control devices.

Microprocessors of the type used in embedded systems are typically single tasking microprocessors, i.e. the microprocessor can execute a single series of software instructions at a given time. Consequently, in order to schedule the execution of the various program modules in the application layer, the embedded systems include an operating system (OS) which schedules the execution of the various modules in the application layer at preset time intervals.

For example, in a typical embedded system of the type used for the fuel management control for an engine having a temperature sensor, a mass airflow sensor and an electronic throttle, the operating system may, for example, control the execution of the various code modules within the application layer to process a signal from the mass airflow sensor every 50 milliseconds, process the temperature signal from the temperature sensor every 1000 milliseconds, and to process the output to the electronic throttle control every 10 milliseconds. Typically, the OS controls the scheduling of the execution of the modules in the application layer by way of software interrupts. Additionally, however, the operating system may schedule the execution of program modules in the application layer in response to hardware interrupts.

Consequently, in order to fully program a microprocessor in an inventive system, it is necessary to coordinate not only the software programming between the BIOS and the application layer, but also between the operating system and the application layer in order to achieve the desired programming for the microprocessor.

In order to facilitate the generation of programming for microprocessors in embedded systems, there have been a number of previously known software tools to facilitate the generation of software for the microprocessors in such embedded systems. Typically, the software utilizes C programming although other programming languages may also be used.

One previously known software tool to facilitate the programming of microprocessors in such systems is Real-Time Architect (RTA) by LiveDevices. The RTA software tool can be used to automatically generate the operating system kernel files for specific target microprocessors. However, the software generated by RTA must be manually inputted by the programmer in order to properly connect the operating system with the application layer. Furthermore, the programmer must manually ensure that no conflicts exist with the BIOS or debugger settings for the microprocessor.

A still further software tool for generating software is Ascet-SD from ETAS. The Ascet software tool can be used to generate software in the C language for both the operating system as well as the application layer. The Ascet-SD software tool also has Ercosek integrated within it which generates the operating system program code. However, the Ascet-SD software tool does not integrate the application layer with the BIOS. Consequently, such integration between the application layer and the BIOS must be done manually.

A still further software tool is known as TargetLink from dSPACE. The TargetLink software tool utilizes a graphical interface to automatically generate software in the C programming language for the application layer only. TargetLink is incapable of generating software code for either the OS or the BIOS and, as such, integration of the application layer with both the OS and the BIOS must be done by hand.

MakeApp by IAR also forms a software tool for automatically generating software for microprocessors in embedded systems. However, the MakeApp system only generates software in the C programming language for the BIOS. The BIOS code must then be manually integrated by the programmer with the application layer and the operating system.

Real-Time Workshop (RTW) by Mathworks also forms a software tool for generating computer software for microprocessors in embedded systems. While RTW provides for automatic code generation for microprocessors, it is limited to two families of microprocessors and cannot be used with other types of microprocessors. Such other microprocessors, of course, may be necessary for a particular application where, for example, the number of channels supported by the BIOS for the microprocessors supported by RTW are insufficient for that particular application.

Consequently, all of the previously known software tools for generating software for microprocessors used in embedded systems are necessarily limited not only by the type of microprocessor that is supported by the software tool, but in other cases which require hand computer software coding. Such hand coding is not only type consuming, and therefore expensive, but is also prone to error. Such errors further lengthen the time necessary to test and debug the overall system.

SUMMARY OF THE PRESENT INVENTION

The present invention provides a method for generating computer software for microprocessors used in embedded systems by zero hand coding which overcomes all of the above-mentioned disadvantages of the previously known software tools.

In brief, the method of the present invention generates computer code for microprocessors having a basic input-loutput system (BIOS) with at least one input/output channel and, more typically, numerous input/output channels. Each of these input/output channels exhibits a predetermined functionality or protocol. For example, one input/output channel may be configured as a PWM (pulse width modulation) I/O channel, a second channel designated as a serial data input channel, and a further channel designated simply as a digital high/low channel furthermore, the actual functionalities of the various channels of the microprocessor vary from microprocessor to microprocessor.

The microprocessor also includes an application layer with at least one, and more typically many, code modules. Each code module interfaces with input/output signals from the BIOS. For example, assuming that the embedded system is used in the fuel management system for an automotive internal combustion engine, one code module in the application layer may process the signal from the BIOS from a mass airflow sensor. The code module in the application layer would then process the signal, perhaps together with other input signals from other channels of the BIOS, to control the position of an electronic throttle for better fuel economy, lower emissions, etc. The actual control of the electronic throttle would also be through a channel in the BIOS.

The microprocessor also includes an operating system (OS) which schedules execution of the events in the application layer depending on a preset priority. For example, again assuming the microprocessor is used in the fuel management control system for an internal combustion engine, the operating system may schedule the execution of the code module in the application layer to determine the mass airflow from the mass airflow sensor every 100 milliseconds, determine the temperature of the engine coolant from a temperature sensor through another channel in the BIOS every 200 milliseconds, etc. The operating system schedules the execution of the various code modules in the application layer through software interrupts and also controls the execution of hardware interrupts, if present.

The method of the present invention uses a graphic user interface (GUI) and zero hand coding to select the various channels of the BIOS by functionality of those individual channels. This functionality, or input/output protocol such as PWM, serial data, etc., varies from microprocessor to microprocessor and from the individual channels for a given microprocessor. The actual available channels, together with their functionality, for the microprocessor are stored in a data file.

The GUI is then used to select various program code modules in the application layer to process the input/output signals from the BIOS. In responses inputted by the programmer to the GUI, the method associates each selected program code module with at least one channel of the BIOS.

The programmer then uses the GUI to schedule event processing in the OS graphically. In particular, the GUI sets forth at least two, and oftentimes many, different tasks each having their own scheduling interval. The GUI is then used to assign each of the program code modules into one or more of the different tasks scheduled by the OS.

After completing the design of the BIOS, application layer and OS utilizing solely the GUI, the method of the present invention then automatically generates computer software, either independently or for use in conjunction with other available software tools, preferably in the C programming language, to interface the input/output from each selected channel in the BIOS with its associated program code module and to implement the schedule event processing in the OS. Thereafter, the generated code is stored in dynamic or persistent memory, or both, for subsequent use in programming the microprocessor in the embedded system.

As explained more fully in the detailed description of the invention, the GUI is also used to graphically calibrate the microprocessor in the embedded system, to implement different target settings for the microprocessor wherein each different target setting adds different memory address allocations and to selectively mask data bits from selected channels in the BIOS as well as other functions. Furthermore, the method of the present invention enables different program code modules in the application layer to be selectively used, stored and reused in other applications, and is also applicable for any type of microprocessor.

Since the method of the present invention automatically generates the computer software for the operating system, application layer as well as the BIOS and without the need for any hand coding of computer software, the method of the present invention provides a much more rapid software development for the microprocessor in the embedded system as well as reduced debugging and testing requirements due to the elimination of mistakes made by hand coding.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
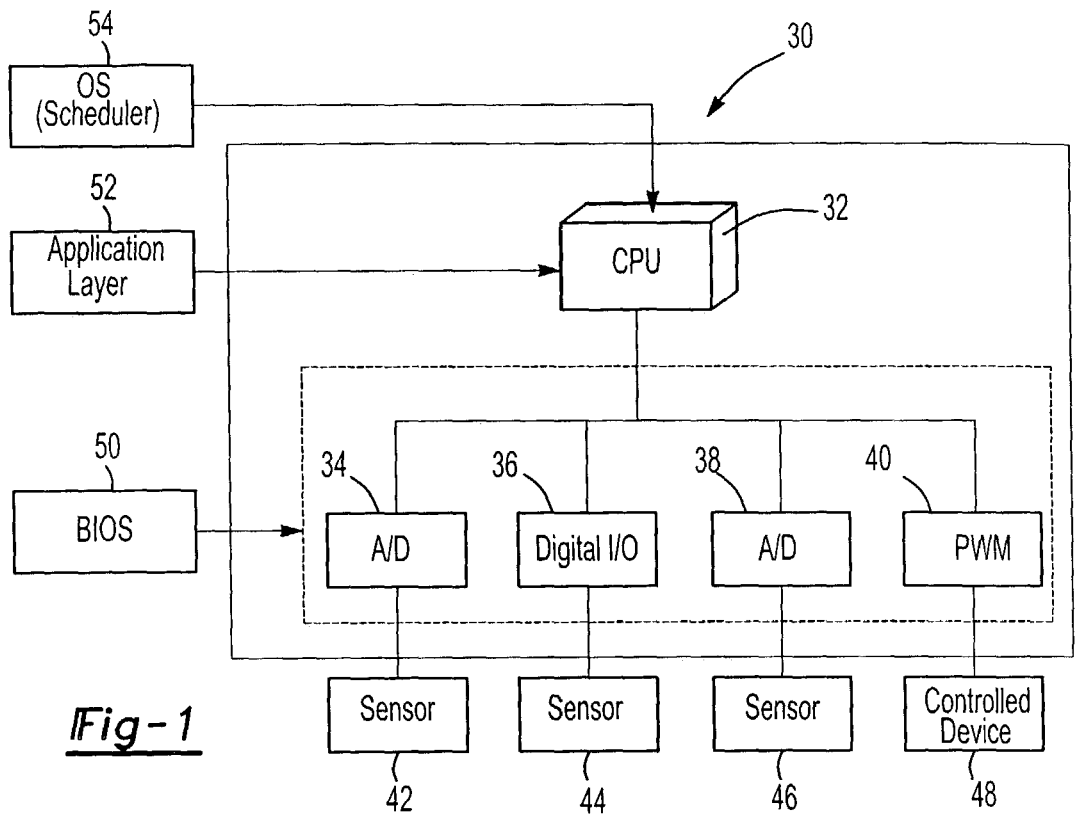
FIG. 1 is a block diagrammatic view illustrating a microprocessor-based embedded system.

With reference first to FIG. 1, a microcontroller-based embedded system 30 is shown diagrammatically having a central processing unit 32, typically a microprocessor, such as the Hitachi Super H microprocessor. The microcontroller 30, furthermore, includes a plurality of input/output channels 34–40 for interfacing with external devices 42–48.

Each channel 34–40, furthermore, has its own pre-assigned functionality or input/output protocol. Such functionality for the particular channels 34–40, as well as the number of channels 34–40, will vary from one microprocessor to another microprocessor. However, as illustrated in FIG. 1, the channel 34 provides an analog/digital (A/D) processing while the channel 36 provides digital I/O functionality. The channel 38 exhibits the functionality of a pulse width modulation (PWM) signal while the channel 40 exhibits A/D functionality.

The present invention will be described for use in conjunction with a microprocessor-based embedded system for the fuel management system of an automotive vehicle. It will be understood, of course, that no undue limitations should be drawn therefrom and that the method of the present invention can be used with other types of embedded systems in other applications.

Still referring to FIG. 1, the channels 34–40 are each connected to their own external device. For example, the A/D channel 34 is coupled with a sensor 42, such as a mass airflow sensor. Similarly, the sensor 44 could comprise a temperature sensor and is connected to the digital I/O channel 36. A still further sensor 46 indicative of some other engine condition is coupled to the A/D channel 38 while the PWM channel 40 is connected to a controlled device 48, such as an electronic throttle control. Thus, in operation, as will be more fully described hereinafter, the microprocessor 32 processes the input signals from the various sensors 42–46, as well as other sensors and other inputs, and then controls the position of the electronic throttle control 48 through the channel 40.

Still referring to FIG. 1, the microprocessor 32 includes a basic input/output software (BIOS) 50 for receiving/transmitting input/output signals from the various channels 34–40. The processing of the input/signal signals by the BIOS 50, however, merely provides raw data for use by the microprocessor. For example, the BIOS 50 will control the channel 34 to provide a digital signal to the CPU 32 of, for example, a digital value between 0 and 1 depending on the input signal from the sensor 42.

The system 30 also includes an application layer, illustrated diagrammatically at 52 in FIG. 1, which processes the input/output signals from the various channels 34–40 in the BIOS. The application layer 52 typically comprises a plurality of program code modules wherein each module is designed to process a different type of signal depending upon both the type of sensor as well as the functionality or input/output protocol from the channels 34–40. For example, the application layer may contain a program module that accepts the digital signal from the channel 34 and, assuming, for example, that a mass airflow sensor 42 is coupled to the channel 34, processes that signal from the channel 34 to compute a value indicative of the mass airflow rate to the internal combustion engine. Similarly, the application layer 52 will contain a different program code module that will process the PWM signal from the channel 38 to determine the temperature from the temperature sensor 46. A still further program code module in the application layer 52 will determine the desired position of the throttle to achieve some desired engine performance, such as reduced emissions, fuel economy, and the like, and then generate output signals through the channel 40 to the electronic throttle control or controlled device 48.

Still referring to FIG. 1, the microprocessor 32 in the system 30 is typically a single tasking microprocessor, i.e. the microprocessor 32 can perform only a single series of instructions at a given time. Consequently, in order to provide for proper processing from all of the sensors 42–46, as well as the control of all control devices 48, the system 30 includes an operating system (OS), illustrated diagrammatically at 54, to schedule the processing of the various program code modules in the application layer 52 at predetermined intervals. Typically, the operating system 54 includes two or more tasks in which each task is executed at its own predetermined interval and, once executed, sequentially executes one or more program modules in the application layer. The operating system controls the execution of the various program code modules in the application layer through software interrupts, but may also handle or schedule the execution of program modules in the application layer 52 in response to hardware interrupt(s).

Figure 2:
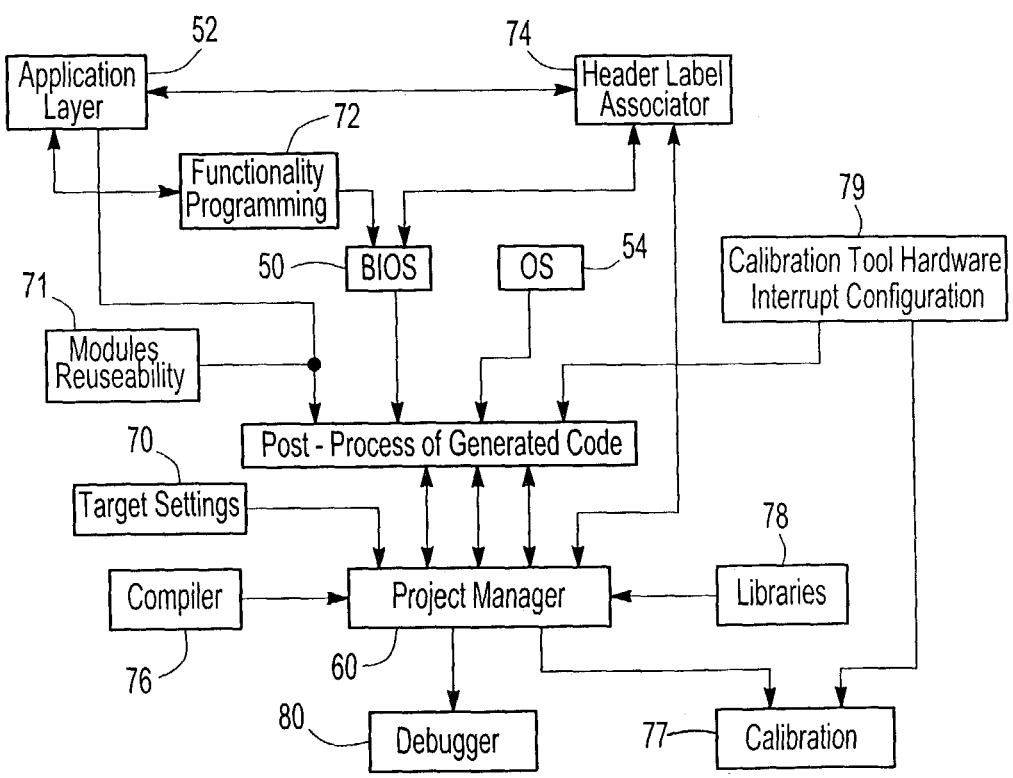
FIG. 2 is a block diagrammatic view illustrating the organization of the preferred embodiment of the present invention.

With reference now to FIG. 2, a preferred embodiment of the method of the present invention is illustrated diagrammatically and includes a project manager 60 which manages the organization of all header files, data files and program files necessary to completely program and implement the embedded system 30. The project manager 60 receives input signals from a plurality of different sources.

More specifically, the project manager receives header data and program files from the BIOS 50 representative of the number of different input/output channels available to the BIOS 50 as well as the functionality or input/output protocol for each channel. As each channel is used in the particular project, the project manager 60 maintains a list of data files of the remaining available channels in the BIOS 50.

The operating system 64, also containing data, header and program files, is also coupled to the project manager 60. The project manager 60 then maintains a list or data file of the various tasks scheduled for execution by the operating system 64.

The project manager 60 also maintains a list or data file of the various header files and program modules in the application layer 52. The application layer 52 contains at least one, and more typically many, different program modules.

The project manager 60 also receives a target setting from block 70. The target setting sets forth different memory allocations that are available to the particular microprocessor.

The system 30 further includes functionality programming 72, which will be described later in greater detail, for connecting the BIOS 50 with the application layer 52 by function of the various channels 34 in the BIOS 50. A header label associator block 74, which will also be later described in greater detail, creates and stores data relating to both the application layer 52 as well as the BIOS 50. This header label associator block 74 also provides data to the project manager 60.

The project manager 60 invokes a conventional compiler 76 as well as various software libraries 78 in order to ultimately generate executable code. Preferably, debugger software 80 is used for performing any desired debugging of the generated code. The compiler 76, libraries 78 and debugger 80 may be of any conventional construction.

The method of the present invention utilizes a graphic user interface (GUI) for the automatic generation of project header files of the type used by the C programming language. These project header files employ programmer-selected labels for consistent and simplified definition of the various channels in the BIOS, in-line functions as well as other program functions.

Figure 3:
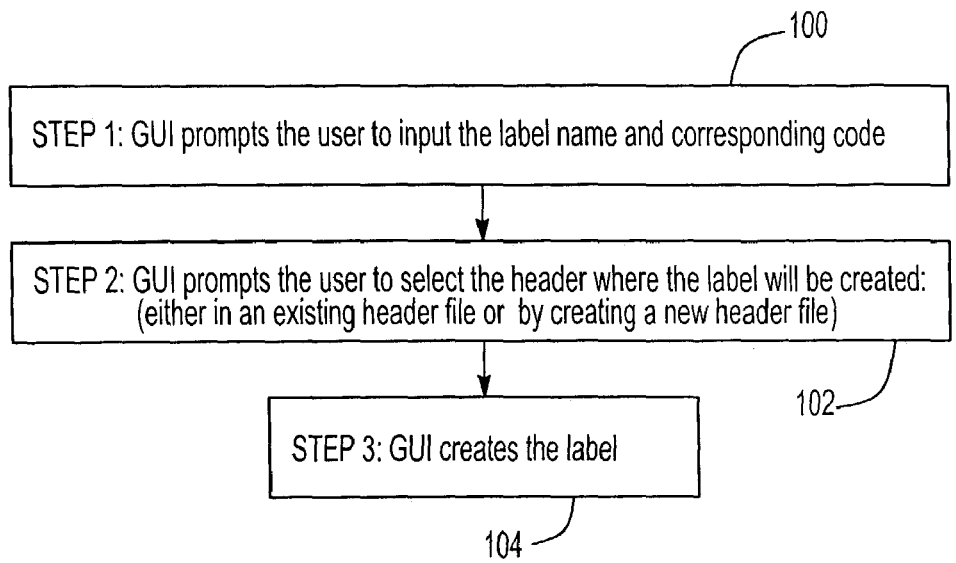
FIG. 3 is a flowchart of the header label associator of the present invention.

With reference now to FIG. 3, at step 100, the GUI prompts the programmer to input the label name as well as the code corresponding to that label name. Step 100 then branches to step 102.

At step 102, the GUI prompts the programmer to select a header file where the label will be created. The header file may be either an existing header file, or a new header file may optionally be created. Step 102 then exits to step 104 where the GUI creates the label in the designated header file. The method of the present invention, furthermore, is programmed in response to the programmer inputs at step 100 as well as step 102 to detect, warn and prevent unintended duplication of function names in the header files.

Figure 4:
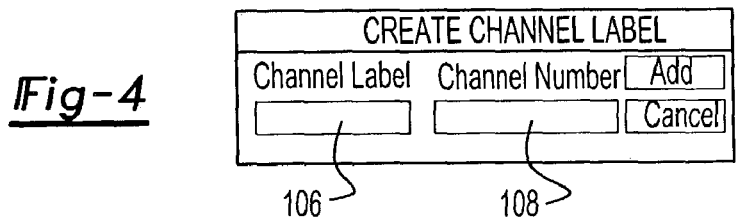
FIG. 4 is a screen depiction of a portion of the GUI for the BIOS channel labeling.

With reference now to FIG. 4, the GUI of the method of the present invention is also utilized to assign programmer selected names to the various channels 34–40 in the BIOS. FIG. 4 is a screen display having a first block 106 in which the programmer enters a programmer selected label for a particular channel. Similarly, the programmer enters a channel number in a block 108 corresponding to the label entered in block 106.

For example, the programmer may enter the acronym MAF for a mass airflow sensor in the block 106 and then assign channel 2 in the block 108. The method of the present invention would then generate computer code, typically stored in a header file, associating the channel name with the channel number. For the example given, the method of the present invention would generate the following line of computer code which associates the label MAF with the second channel:

define MAF 2 //BIOS channel label

Figure 5:
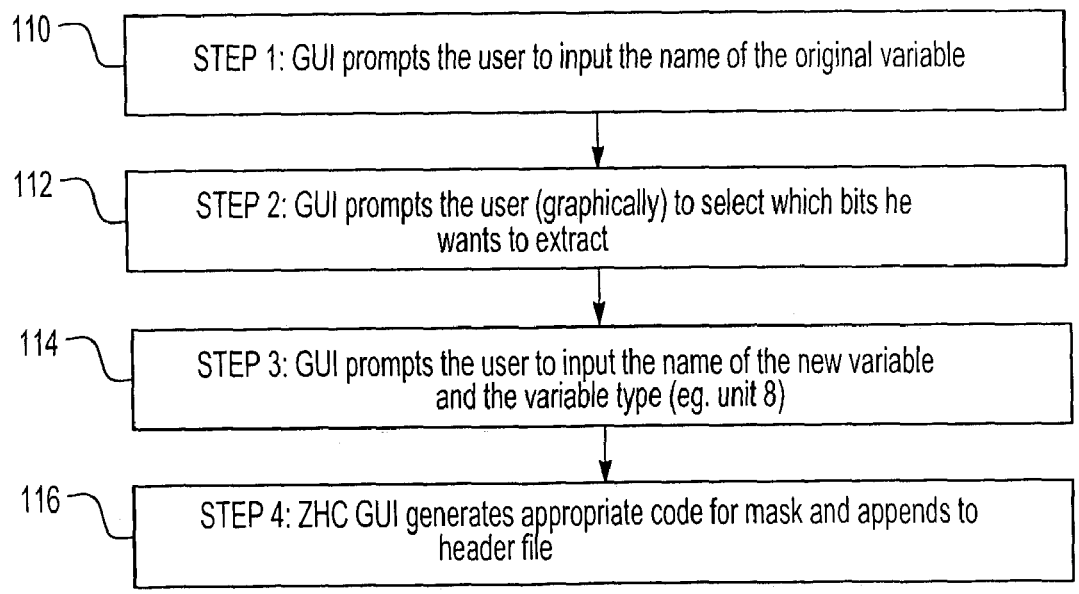
FIG. 5 is a flowchart of the data masking routine of the present invention.

The method of the present invention enables the GUI to also automatically generate a bit mask for use with the various channels 34–40 in the BIOS. With reference to FIG. 5, at step 110 the GUI prompts the programmer to input the name of the original variable which would correspond to the variable outputs from a particular channel in the BIOS 50. Step 110 then branches to step 112.

At step 112, the GUI prompts the programmer to select which bits from the particular variable corresponding to the BIOS channel which the programmer desires to extract from the BIOS channel. Step 112 then branches to step 114 where the GUI prompts the programmer to input the name of the new variable as well as the variable type. Such variable types, furthermore, are predefined. For example, an eight bit integer may be a variable type unit 8 and used when up to eight bits are extracted by the mask. Conversely, a variable type unit 16 may be used for a 16 bit integer when the desired mask extracts up to sixteen bits from the variable selected at step 110.

Step 114 then branches to step 116 in which the method of the present invention generates the appropriate code for the mask and adds that generated code to the appropriate header file. For example, to mask the low byte of a two-byte hexadecimal number, the method illustrated in FIG. 5 generates the following header file code:

define MASK_LOW_BYTE 0x00ff //Mask Generator

The method of the present invention also uses the GUI to enable the programmer to create blocks of in-line code for storage in the appropriate header file, preferably the main project header file. To achieve this, the GUI will graphically prompt the programmer to enter the desired in-line code.

For example, the method of the present invention could utilize the GUI to generate an in-line block of programming with the label SERIAL_DATA in which the lower byte of the data from a BIOS channel having the label COM1_data is extracted in the following fashion:

| | |
|---|---|
| #define COM1_data 0x003f980a | // BIOS channel label |
| #define MASK_LOW_BYTE 0x00ff | // Mask Generator |
| #define SERIAL_DATA<br>((unsigned char) (COM1_data &<br>  MASK_LOW_BYTE)) | |
| | //In-line code generator |

After generation of the above code, the label SERIAL_DATA will return the upper byte of a two byte BIOS channel COM1_data.

Each channel 34–40 of the BIOS 50 (FIG. 1) has a pre-assigned functionality or input/output protocol. Furthermore, the project manager 60 (FIG. 2) maintains a data file not only of the functionality of each of the input/output channels 34–40, but also which channels are used and which channels are currently available. Then, by using the GUI, the programmer then selects the desired channel by functionality rather than address or channel number.

Figure 6:
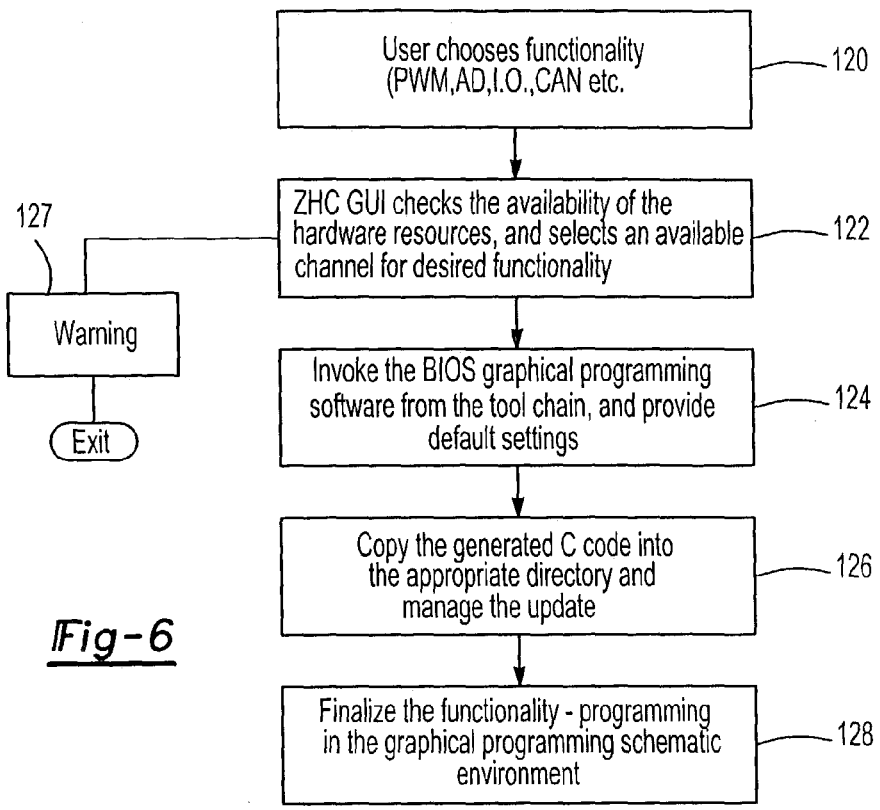
FIG. 6 is a flowchart of the functionality selection of the BIOS channels of the present invention.

More specifically and with reference to FIG. 6, at step 120 the programmer first selects the desired functionality for the BIOS channel. By way of example only, the functionality may be PWM, A/D, I/O, digital high/low, and the like. Step 120 then branches to step 122.

At step 122, the method of the present invention checks the availability of the BIOS channels to determine if a BIOS channel with the desired functionality selected at step 120 is available. If so, step 122 assigns an available channel having the desired functionality, updates the list of available channels maintained by the project manager and then branches to step 124. Conversely, if no channel having the desired functionality selected at step 120 is available, step 122 instead graphically displays a warning at step 126 and exits.

At step 124 the program loads the necessary software programming for the desired functionality and provides default settings for the software, if applicable. The GUI is also used at this time to graphically display the default settings to enable the programmer to select other than default settings if applicable. Step 124 then branches to step 126.

At step 126, the software code generated to achieve the desired functionality for the channel selected at step 122 is copied into the appropriate file which is subsequently accessed by the project manager 60 and then branches to step 128 in which the functionality programming is finalized. Such finalization would entail, for example, updating of the data files of the availability of the BIOS channels, BIOS channels' names, file organization directory and the like.

Consequently, since the method of the present invention only requires the programmer to indicate the desired functionality of the BIOS channel at step 120 and then automatically determines the availability of a channel with the desired functionality, assigns that channel through the GUI and then generates the appropriate programming code for that function, there is no necessity for the programmer to understand the low level hardware details of the microprocessor. Thus, the generation of the software code is not only simplified, but is also free of any errors which would otherwise be introduced by hand coding.

As an added feature of the functionality coding depicted in FIG. 6, in the event that the desired functionality selected at step 120 may be implemented in two or even more ways, the method of the present invention utilizes the GUI to enable the programmer to select which option to implement the functionality is desired by the programmer.

For example, in the event that the programmer selects a modulated signal for an H-bridge driver, such an H-bridge driver can be implemented in at least two different fashions. First, two PWM channels could be used with one channel employed for a positive direction and the other channel for the negative direction. Assuming that two PWM channels are available in the microprocessor, this option could be used.

Conversely, a single PWM channel together with a digital high/low pin could be used in lieu of two independent PWM channels in this latter case, the single PWM channel would represent the magnitude of the PWM signal while the digital pin would be high for one direction and low for the opposite direction. Furthermore, this latter option would be available to the programmer assuming that one PWM channel and a digital high/low pin is available and not yet assigned by the programmer.

If the programmer through the GUI selects the first option, i.e. two independent PWM channels, the flowchart of FIG. 6 would be executed twice, once for each PWM channel. Conversely, if the second option, i.e. one PWM channel and a digital pin were employed, the flowchart of FIG. 6 would be executed once for the PWM channel and once for the digital pin.

Optionally, the programmer would input the type of input/output devices used in the embedded system as well as the type of microprocessor used in the system. The program, by accessing data files containing the input/output protocol for the input/output devices as well as the available input/output channels on the microprocessor, would then generate a default configuration that would accommodate all of the input/output devices as well as the microprocessor. The program would also optionally display any alternative configurations through the GUI to enable the programmer to graphically customize the configuration if desired.

With respect to the application layer 52 (FIGS. 1 and 2) in many instances, a particular program module to handle a particular input/output signal may be used not only in different projects, but also in different projects involving different microprocessors. For example, it may be desirable to use a program code module in the application layer 52 for a PID controller or a program module in the application layer to process the output signal from the BIOS of a particular mass airflow sensor in numerous different projects using the same or different microprocessors.

Figure 7:
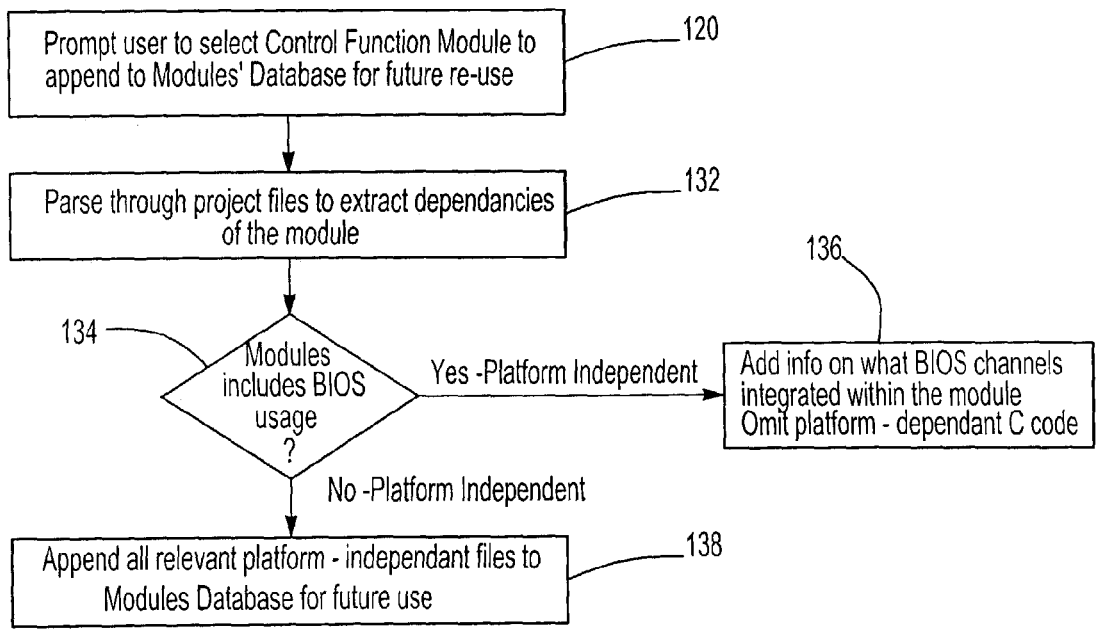
FIG. 7 is a flowchart illustrating the storage of program modules of the application layer for subsequent reuse.

The method of the present invention using the GUI enables these modules for the application layer 52 to be reused in subsequent programs as illustrated diagrammatically at 71 in FIG. 2. With reference to FIG. 7, at step 130, the GUI first prompts the programmer to select the desired program module for the application layer 52. Such selection can be made by the programmer through a menu of available program modules displayed by the GUI to the programmer, or otherwise. In any event, after selection of the desired program module, step 130 branches to step 132. At step 132, the method of the present invention parses through the selected program module to determine what dependencies are required by that particular program module in order to enable operation of that particular program module. Such dependencies may include other program modules in the application layer, data files, lookup tables, etc. After all such dependencies are determined at step 132, step 132 branches to step 134.

At step 134, the program determines if any of the modules identified at step 132 include BIOS usage. If so, step 134 branches to step 136 in which all required information on the identified BIOS channels is integrated into the application code module. Step 136, however, omits code that is dependent upon the particular microprocessor.

Conversely, if the identified program modules do not include BIOS usage, step 134 instead branches directly to step 138. Similarly, step 136, which adds all required programming code except for the microprocessor dependent code to the program module, also branches to step 138.

At step 138, the program appends all relevant microprocessor platform independent files and then stores the compilation of files in persistent memory for future use. Thereafter, the stored program module may be reused in future projects and with different microprocessors when desired.

When incorporating a stored program module for the application layer in a future project, it is always possible that a label conflict could arise due to the label selection used by the programmer in the new project. In that event, the GUI will display an alert to the programmer to enable the programmer to assign new labels in the project in order to avoid the label conflict.

Figure 8:
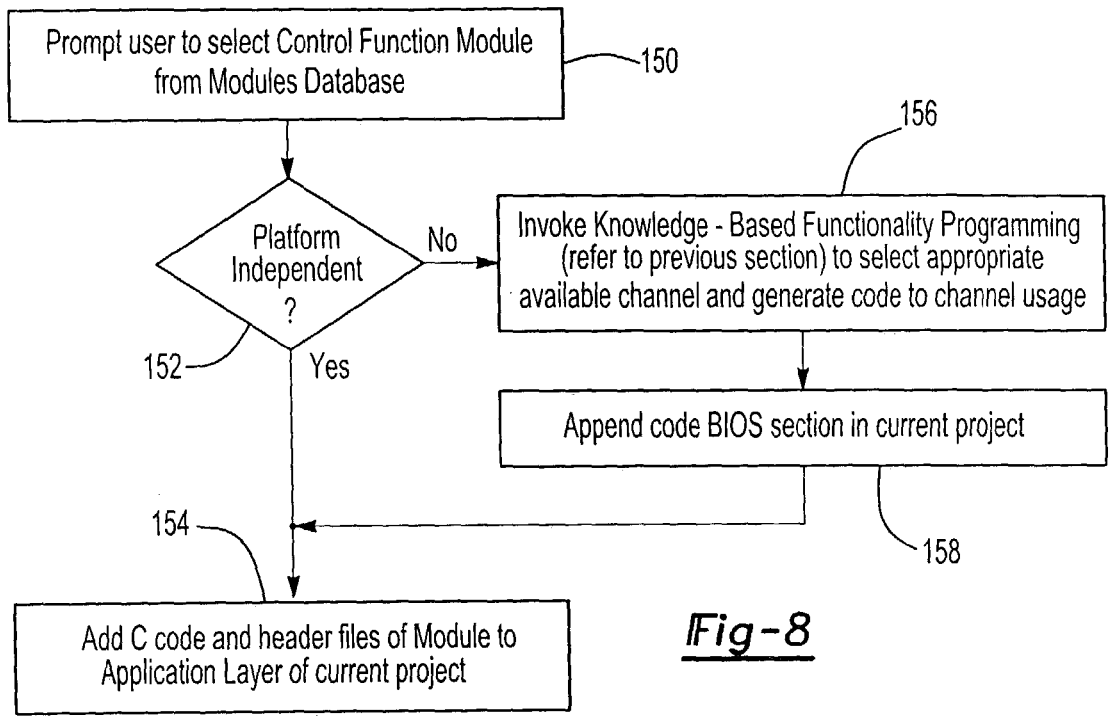
FIG. 8 is a flowchart illustrating the reuse of a previously stored program module of the application layer.

In some cases, the particular application layer program module will be platform dependent, i.e. will contain control functions which require input or output channels from the microprocessor hardware. The flowchart to show the reuse of the stored program module which is hardware dependent is illustrated in FIG. 8.

At step 150, the GUI prompts the programmer to select the desired application function module from the module database. Step 150 then branches to step 152.

At step 152, the program determines if the module is hardware independent. If so, step 152 branches to step 154 where the programming code and required header files of the module are added to the application layer of the current project by the project manager. Conversely, if the application layer code module is dependent upon the microprocessor hardware, step 152 instead branches to step 156.

At step 156 the program generates the BIOS code necessary to implement the BIOS code on the microprocessor on which the selected application code module is dependent. Step 156 then branches to step 158 where that code is appended to the BIOS code in the current project and step 158 then branches to step 154 where the program code and header files are stored in the application layer.

As previously described, the OS schedules the execution of the various program modules in the application layer by one or more tasks. Each task, furthermore, is executed at predefined time intervals and at least one application code module is associated with each task.

Figure 9:
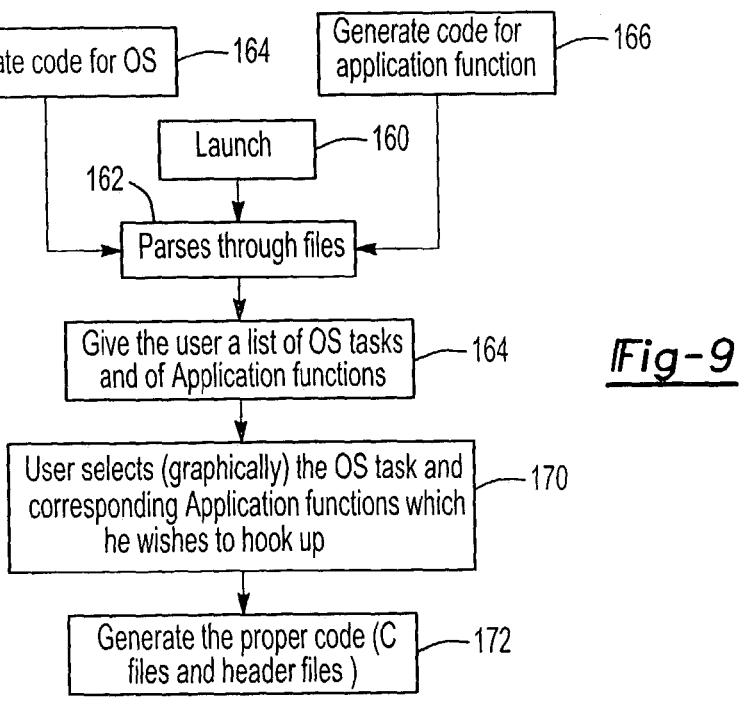
FIG. 9 is a flowchart of the linking of OS tasks in the GUI.

The method of the present invention uses the GUI to associate the various program modules in the application layer with various tasks in the operating system (OS) graphically and without the need for hand program coding. With reference then to FIG. 9, after the GUI is initiated or launched at step 160, the program parses through the various program and header files at step 162. The base code for the operating system from block 164 as well as the code for the application layer from block 166 are accessed by the program of the present invention at step 162. Step 162 then branches to step 168.

At step 168, the GUI graphically provides the programmer a list of all OS tasks as well as all application layer functions in the current project. Step 168 then branches to step 170.

At step 170, the programmer by using the GUI selects and graphically associates each application function in the application layer with one or more tasks in the OS system. It will be appreciated, of course, that each function in the application layer may be assigned to more than one task. Furthermore, any conventional means, such as drag and drop, may be used to graphically associate the various application layers with the OS task.

After all the functions in the application layer are associated with one or more tasks in the OS, step 170 branches to step 172 where the required program code and header files to implement the OS with its associated application functions in the application layer are generated. Furthermore, the program code and header files generated at step 122 are accomplished without the necessity of hand coding the associations between the operating system and the application layer.

Microprocessors of the type used in embedded systems typically use an interrupt vector table to configure the operation of both the OS and the BIOS. In some cases, particularly when different microprocessors and different reused modules in the application layer are employed, conflicts may arise. The method of the present invention, however, resolves and corrects those conflicts.

Figure 10:
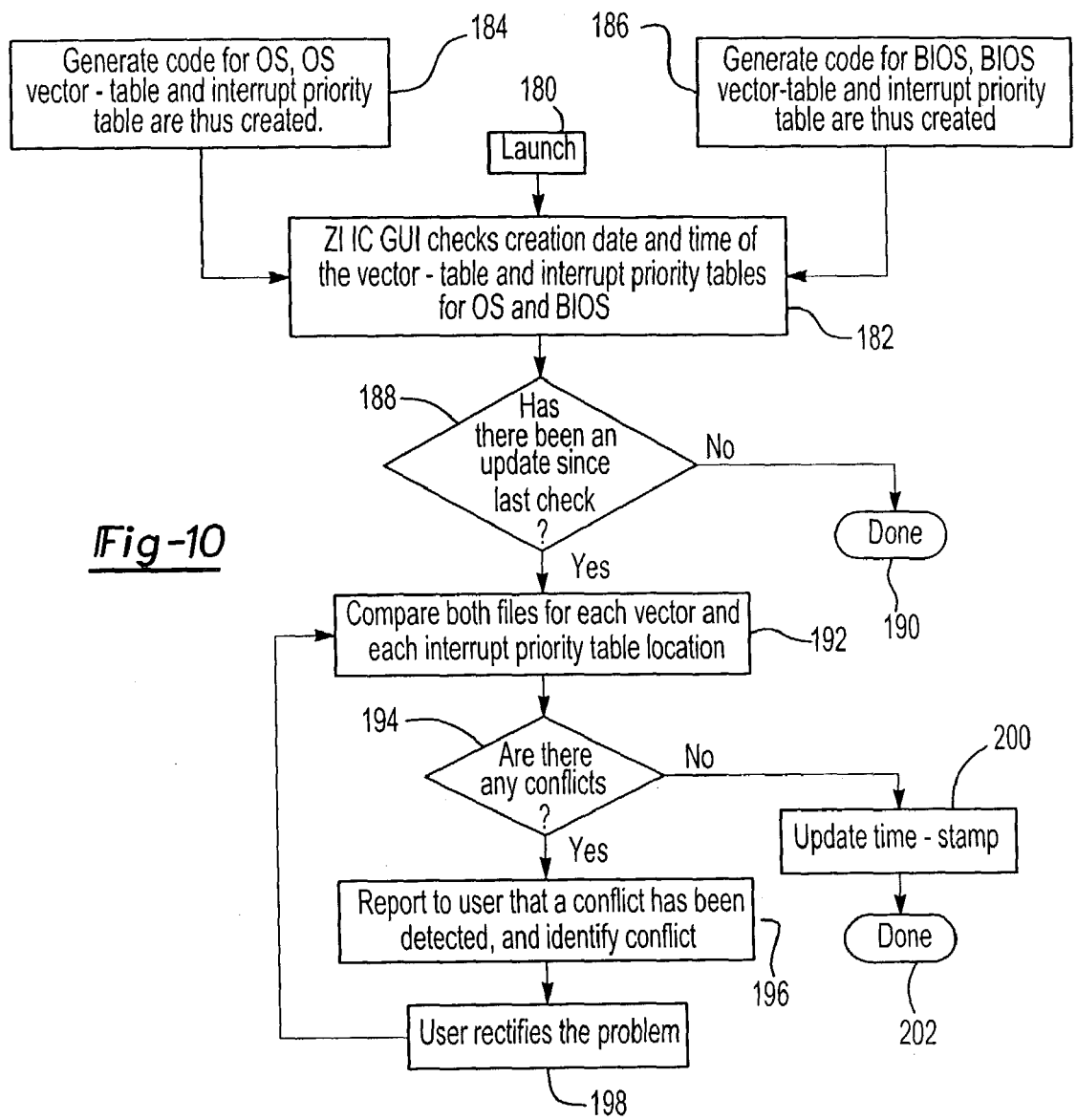
FIG. 10 is a flowchart illustrating the GUI application for a calibration program.

More specifically, with reference to FIG. 10 after the program is launched at step 180 the program proceeds to step 182 in which the program checks the creation date and time of the vector table and interrupt priority tables for both the OS and the BIOS. In order to check the creation date and time of the vector table and interrupt priority tables, step 182 also receives the generated code and OS vector table in interrupt priority from block 184 as an input and, likewise, receives the BIOS vector table and interrupt priority tables from block 186 as input data. Step 182 then branches to step 188.

At step 188, the program first determines if there has been an update since the last check of the vector table and interrupt priority data. If not, step 188 branches to step 190 and exits the program. Otherwise, step 188 branches to step 192.

At step 192 the program sequentially compares the vector table and interrupt priority table for the OS with the vector table and interrupt priority table for the BIOS. Step 192 then branches to step 194 which determines if a conflict exists. If so, step 194 branches to step 196 where the GUI graphically reports to the programmer that a conflict has been detected together with an identification of that conflict. Step 196 then branches to step 198 where the program graphically enables the programmer to rectify the conflict, perhaps by selecting a different label. Step 198 then branches to step 192 to ensure that the rectification made by the programmer at step 198 did not create a new conflict.

Conversely, if no conflicts are detected, step 194 instead branches to step 200 where a time and date stamp is applied to the vector table and interrupt priority table for subsequent use at step 188. Step 200 then branches to step 202 and exits the routine.

The operating system schedules its various tasks, together with the assigned priority for the task, as software interrupt requests. However, in addition to the software interrupt requests scheduled by the OS, the microprocessor typically has one or more hardware interrupts which must also be handled by the operating system. For example, in an automotive vehicle, the signal to inflate an airbag may generate a hardware interrupt of the highest priority.

In order to enable the application layer to properly handle the event of a hardware interrupt, the GUI enables the programmer to modify the interrupt vector table automatically to include such hardware interrupts. Moreover, once the vector table and related header files are configured within the GUI, the program will maintain the existing interrupt vector setting even in the event that the source code is subsequently updated or regenerated.

Figure 11:
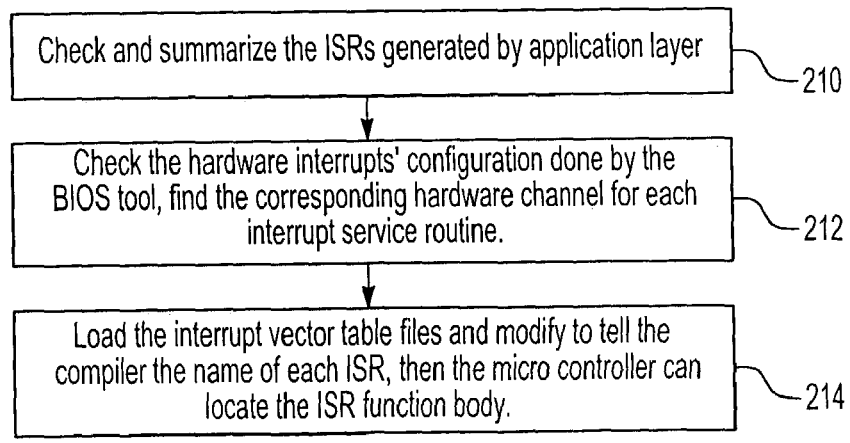
FIG. 11 is a flowchart illustrating the interrupt vector table routine.

With reference now to FIG. 11, the function to handle the hardware interrupts is shown. At step 210, the function first identifies and summarizes the software interrupt signals for the Interrupt Service Routine (ISR) generated by the application layer 52. Step 210 then branches to step 212 where each hardware interrupt channel from the BIOS is identified. Step 212 then branches to step 214 where the vector interrupt tables are modified to include each hardware interrupt and to connect each hardware interrupt with the necessary code module in the application layer which handles that interrupt. Such information is stored in memory and available even in the event of subsequent regeneration or modification of the application layer.

Following the initial programming of the microprocessor for a particular application, such as a fuel management control system for an automotive vehicle, it is oftentimes necessary to calibrate the particular system. Such calibration may entail adjustment of PID controllers, modification of lookup tables, etc. necessary to obtain the desired operation of the final system.

Conventionally, the standard calibration tools used to calibrate the system utilize a hardware interrupt signal with the highest possible priority. The calibration program illustrated diagrammatically at 77 in FIG. 2 is typically applied to the system 30 as the last portion of the software created for the microprocessor. Furthermore, it is necessary that the calibration tool setting not conflict with any memory, hardware or software interrupts of the program microprocessor and typically interfaces through a hardware interrupt configuration illustrated diagrammatically at 79 in FIG. 2.

Figure 12:
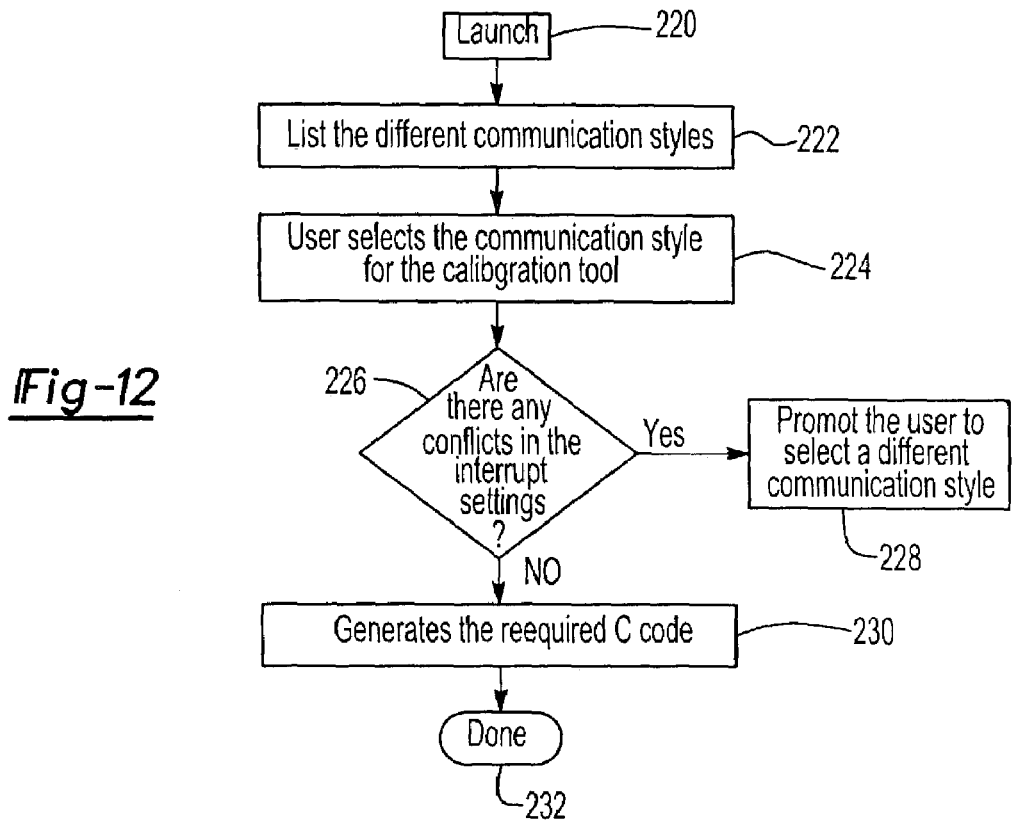
FIG. 12 is a flowchart illustrating the configuration of the calibration tool hardware interrupt.

With reference then to FIG. 12, the function for handling the calibration tool is shown. At step 220, the program is first launched and then branches to step 222. At step 222, the program lists the different communication styles or input/output protocols and then branches to step 224.

At step 224, the programmer using the GUI selects the communication style or input/output protocol for the particular calibration tool. For example, the calibration tool may use a serial data, or other types of input/output in order to perform the calibration. Step 224 then branches to step 226. At step 226, the calibration program determines if there is any conflict between the interrupt settings used by the calibration tool and the software and other hardware interrupts used by the microprocessor. If so, step 226 branches to step 228 at which the GUI prompts the programmer to select a different input/output communication style. Step 228 then branches to step 222.

Conversely, if there are no conflicts between the interrupt settings of the calibration tool and the microprocessor, step 226 instead branches to step 230 where the required computer code to handle the calibration program is generated and stored. Step 230 then branches to step 232 and exits from the function.

Figure 13:
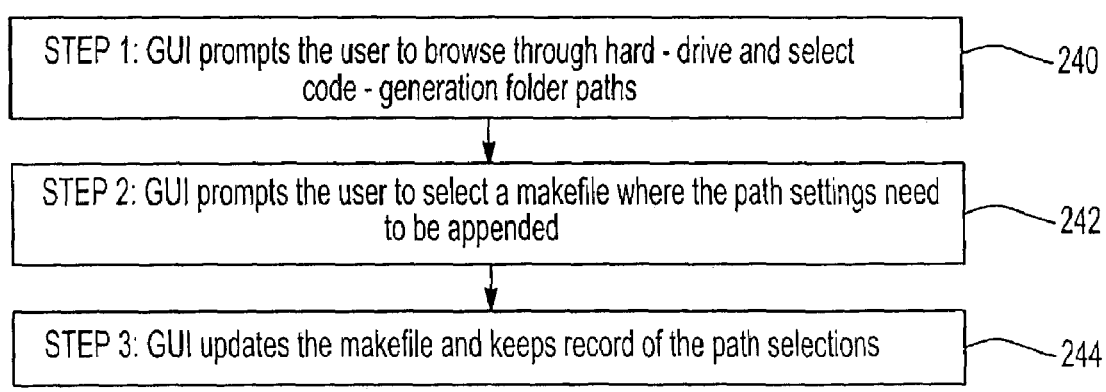
FIG. 13 is a flowchart illustrating the path configuration function and file organization of the present invention.

The implementation of the present invention, through the GUI, also enables the programmer to control the path configuration and file organization of the program without hand coding. With reference then to FIG. 13, at step 240, the GUI prompts the programmer to browse through the persistent memory, typically a hard drive, and select the code generation folder paths. Once selected, step 240 branches to step 242.

At step 242, the GUI prompts the programmer to select the destination of the final program and where the path settings need to be appended. Step 242 then branches to step 244 where the GUI updates the destination file for the program and maintains a record of the path selections made by the programmer.

Many modern microprocessors enable the programmer to reconfigure the memory layout utilized by the microprocessor. This memory reconfiguration enables the programmer to relocate internal memory, which usually occupies the first block of memory including the starting address 0 at power up, to another address memory block. By doing so, external memory, such as external RAM, can be relocated to address 0 and executed upon power up of the microprocessor. Such reconfiguration of the memory is also useful to enable interchangeability of different microprocessors from the same family but with different memory availability.

In order to facilitate the reconfiguration of memory, the present invention, through the GUI, enables the programmer to reconfigure the memory as desired and then, without hand coding, generate code necessary to achieve that memory reconfiguration.

Figure 14:
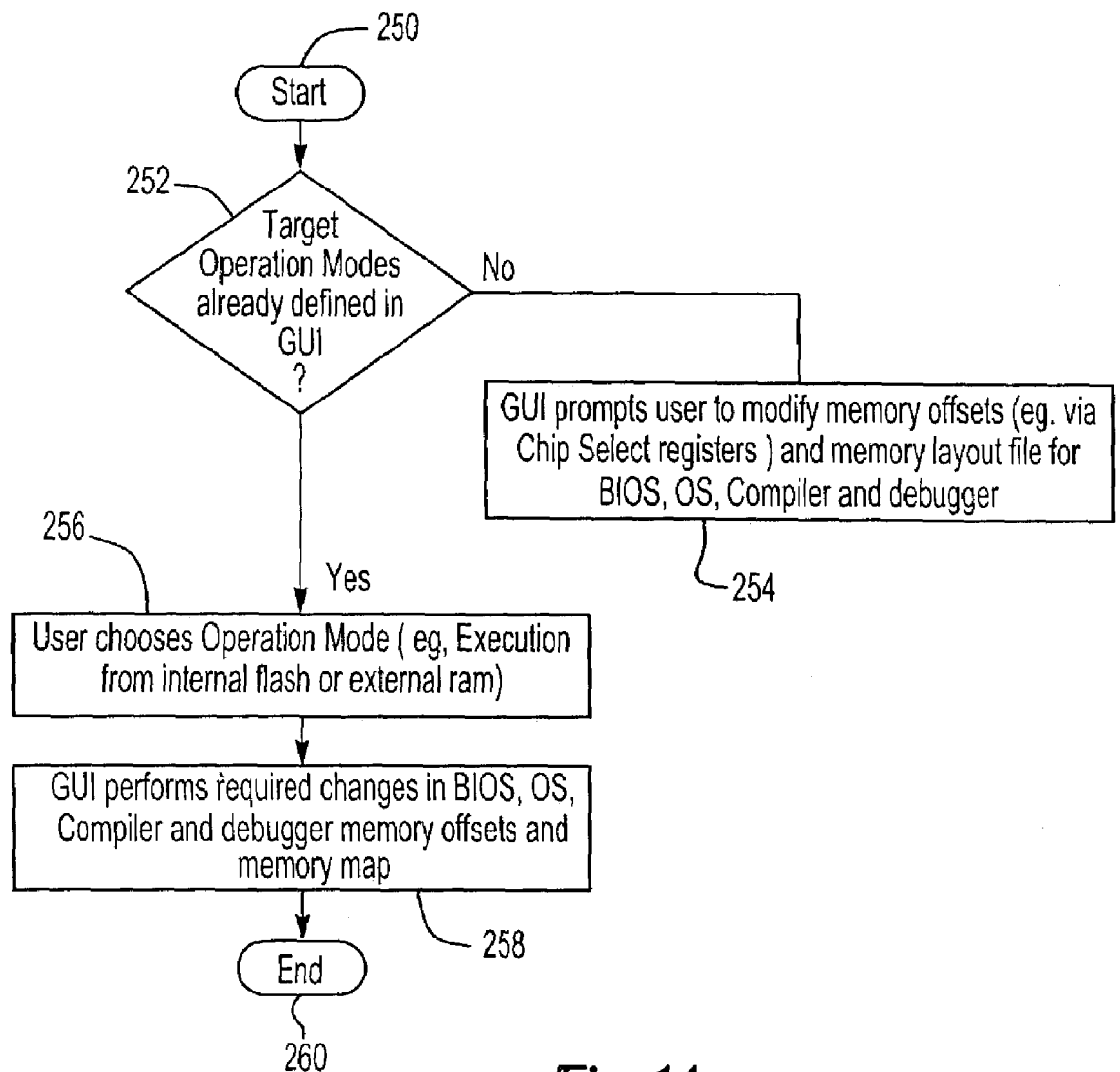
FIG. 14 is a flowchart illustrating the implementation of different target settings involving the microprocessor.

With reference then to FIG. 14, in order to reconfigure the target setting, the program after starting at step 250 branches to step 252 which determines if the target operation modes are already defined in the GUI. If not, step 252 branches to step 254 where the GUI prompts the programmer to input the memory layout file for the BIOS, OS, compiler and debugger. Step 254 then branches to step 256.

Conversely, if the target operation modes are already defined in the GUI, step 252 bypasses step 254 and instead branches directly to step 256. At step 256, the programmer chooses the operation mode or memory configuration for the microprocessor. Step 256 then branches to step 258 where the program modifies the BIOS, OS, compiler and debugger memory offsets to reflect the memory configuration set at step 256. Step 258 then branches to step 260 and exits the program.

Although the present invention has been described for use during the initial programming of the microprocessor for the embedded system, it will also be understood that the present invention can be used at later times to update, reconfigure and/or reload the programming for the embedded system. For example, assuming that embedded system is used to control the fuel management for an internal combustion engine, upon repair or replacement of an input/output device at a time temporally spaced from the initial programming of the microprocessor, it may be desirable or even necessary to reprogram the microprocessor to accommodate the new or updated input/output device. The present invention achieves this by enabling the repair facility to regenerate the appropriate code using the GUI and then reload the newly generated program code into memory for execution by the microprocessor. The repair facility can also use the GUI to update the existing program code to a more recent version of the program code and then reload the updated program code into memory for execution by the microprocessor. Such updated program code typically would provide for enhanced system operation, elimination of programming bugs, etc.

From the foregoing, it can be seen that the present invention provides a method for automatic code generation of code for embedded microprocessor systems of the type having a BIOS, application layer and OS. Furthermore, the present invention achieves this through the GUI thus eliminating the need for hand coding of computer code. By elimination, or at least substantial reduction, of hand coding, both the time spent in hand coding as well as errors entered into the code through hand coding are avoided.

Although the present invention has been described for use as an embedded system for a fuel management system of an automotive internal combustion engine, it will be appreciated that the present invention can be used for other embedded systems, e.g. consumer products, toys, machining tools, and smart appliances. Furthermore, although the present invention has been described in conjunction with the C programming language, it will be understood, of course, that the present invention is applicable to any desired programming language.

Having described our invention, many modifications thereto will become apparent to those skilled in the art to which it pertains without deviation from the spirit of the invention as defined by the scope of the appended claims.

We claim:

1. A method for generating computer software for a microprocessor having a basic input/output system (BIOS) with at least one input/output channel, an application layer having at least one code module which processes input/output signals from an associated channel in the BIOS and an operating system (OS) which schedules the execution of events in the application layer comprising the steps of:
   using a graphical user interface (GUI) to select a channel(s) of the BIOS by functionality,
   using said GUI to select a program code module(s) in the application layer to process input/output signal(s) and associating said selected program code module(s) with at least one channel of the BIOS,
   using said GUI to schedule event processing in the OS,
   generating computer software in response to selections made in the GUI to interface the input/output from each selected channel of the BIOS with its associated program code module and to implement scheduled event processing in the OS, storing all of said generated computer software in memory, wherein said microprocessor includes at least one hardware interrupt, each hardware interrupt having an associated function and further comprising the steps of:

using the GUI to graphically associate each hardware interrupt with its associated function, generating a data file of computer software to maintain the association between each said hardware interrupt and its associated function regardless of changes in other portions of the computer program for the microprocessor, using the GUI to graphically select the type of data communication desired for calibration of the microprocessor with respect to its programmed application, determining if the selected type of data communication is available and unimplemented, if the selected type of data communication is available and unimplemented, generating calibration computer software to associate calibration software with the selected type of data communication, determining if there is any conflict between the interrupt settings used by the calibration tool and the software and other hardware interrupts used by the microprocessor, and storing said generated calibration software.

2. The invention as defined in claim 1 wherein said computer software generating step further comprises the step of generating at least one data file containing definitions relating to said channels of said BIOS.

3. The invention as defined in claim 2 wherein said computer software generating step further comprises the step of generating in-line programming functions and storing said in-line programming functions in said at least one data file.

4. The invention as defined in claim 1 and further comprising the steps of associating a label with a block of computer software, incorporating said block of computer software using said GUI and said label and wherein said computer software generating step further comprises the step of storing said block of computer software in memory.

5. The invention as defined in claim 1 wherein said computer software generating step further comprises the step of generating at least one data file containing data bit mask definitions.

6. The invention as defined in claim 5 wherein said data bit mask definitions relate to the BIOS input/output signals.

7. The invention as defined in claim 1 and comprising the step of archival storing said program code modules.

8. The invention as defined in claim 7 and comprising the step of determining if the archival stored program code module is BIOS independent and, if not, storing data representative of the type of BIOS channels on which the archival stored program code module is dependent.

9. The invention as defined in claim 8 and comprising displaying the type of BIOS channels on which the archival stored program code module is dependent in the GUI during subsequent reuse of the program code module.

10. The invention as defined in claim 9 and comprising the steps of searching through the types of uncommitted BIOS channels and automatically assigning an uncommitted BIOS channel of the type on which the archival stored program code module is dependent if available.

11. The invention as defined in claim 1 wherein said step of using said GUI to schedule event processing in the OS further comprises the steps of:

graphically displaying a plurality of OS tasks having different timing and/or priority in the GUI, graphically associating each program code module with one or more tasks in the GUI, and generating computer OS software to execute each program code module associated with each task during the execution of each said task.

12. The invention as defined in claim 1 wherein the generated computer software is stored in a plurality of files and comprising the steps of using the GUI to select the directory path(s) to the files and staring said selected directory path(s).

13. The invention as defined in claim 1 wherein said microprocessor is configurable to two or more targets, each target having its own memory allotment configuration, and using the GUI to graphically select the desired target, generating computer software representative of the selected target and storing said computer software representative of the selected target.

14. The invention as defined in claim 1 wherein said microprocessor is utilized in a fuel management system for an internal combustion engine having at least one sensor which provides an output signal representative of an engine condition, and at least one controlled device which, in response to a signal, controls an aspect of operation of the engine, said sensor and said controlled device each being connected to an associated channel of the microprocessor.

15. The invention as defined in claim 1 and further comprising the steps of:

automatically determining the input/output protocol of selected input/output devices, automatically determining the availability of microprocessor channels and the input/output protocol for each channel, and automatically generating a default configuration in which each input/output device is interfaced with a channel having a compatible input/output protocol.

16. The invention as defined in claim 1 and comprising the step of reloading at least a portion of the program code at a time temporally spaced from the initial operation of the microprocessor.

17. A fuel management system for an internal combustion engine comprising:

at least one sensor which provides an output signal representative of an engine condition, at least one controlled device which, in response to a signal, controls an aspect of operation of the engine, a programmable microprocessor having a BIOS for inputting signal(s) from said at least one sensor and for outputting signal(s) to said at least one controlled device, an application layer containing at least one program module which processes said input signal from the BIOS and generates output signals in response thereto through the BIOS to said at least one controlled device, and an operating system which schedules execution of said at least one program module in the application layer, wherein an interface between said BIOS, said application layer and said operating system is accomplished through a graphical user interface which uses channel functionality to select the software for said BIOS and without the need for hand program coding, wherein said microprocessor includes at least one hardware interrupt, each hardware interrupt having an associated function and further comprising:

means for graphically associating each hardware interrupt with its associated function, means for generating a data file of computer software to maintain the association between each said hardware interrupt and its associated function regardless of changes in other portions of the computer program for the microprocessor, means for graphically selecting the type of data communication desired for calibration of the microprocessor with respect to its programmed application, means for determining if the selected type of data communication is available and unimplemented, if the selected type of data communication is available and unimplemented, means for generating calibration software to associate calibration software with the selected type of data communication, means for determining if there is any conflict between the interrupt settings used by the calibration tool and the software and other hardware interrupts used by the microprocessor, means for storing said generated calibration software.

18. The invention as defined in claim 17 wherein said interface includes at least one data file containing definitions relating to input/output channels of said BIOS.

19. The invention as defined in claim 18 wherein said interface includes in-line programming function(s) scored in said at least one data file.

20. The invention as defined in claim 17 wherein said interface includes a label associated wiih a block of computer software.

21. The invention as defined in claim 17 wherein said interface includes at least one data file containing data bit mask definitions.

22. The invention as defined in claim 21 wherein said data bit mask definitions relate to the BIOS input/output signals.

23. A computer software program for a microprocessor having a basic input/output system (BIOS) with at least one input/output channel, an application layer having at least one code module which processes input/output signals from an associated channel in the BIOS and an operating system (OS) which schedules the execution of events in the application layer comprising:

means for using a graphical user interface (GUI) to select a channel(s) of the BIOS by functionality, means for using said GUI to select a program code module(s) in the application layer to process input/output signal(s) and associating said selected program code module(s) with at least one channel of the BIOS, means for using said GUI to schedule event processing in the OS, means for generating computer software in response to selections made in the GUI to interface the output from each selected channel of the BIOS with its associated program code module and to implement scheduled event processing in the OS, means for storing all of said generated computer software in memory, wherein said microprocessor includes at least one hardware interrupt, each hardware interrupt having an associated function and further comprising the steps of:

means for using a GUI to graphically associate each hardware interrupt with its associated function, means for generating a data file of computer software to maintain the association between each said hardware interrupt and its associated function regardless of chanaes in other portions of the computer program for the microprocessor, means for using the GUI to graphically select the type of data communication desired for calibration of the microprocessor with respect to its programmed application, means for determining if the selected type of data communication is available and unimplemented, if the selected type of data communication is available and unimplemented, means for generating calibration computer software to associate calibration software with the selected type of data communication, means for determining if there is any conflict between the interrupt settings used by the calibration tool and the software and other hardware interrupts used by the microprocessor, and means for storing said generated calibration software.

* * * * *

UNITED STATES PATENT AND TRADEMARK OFFICE
CERTIFICATE OF CORRECTION

| | |
|---|---|
| PATENT NO. | : 7,197,743 B2 |
| APPLICATION NO. | : 10/379205 |
| DATED | : March 27, 2007 |
| INVENTOR(S) | : Jonathan Borg et al. |

It is certified that error appears in the above-identified patent and that said Letters Patent is hereby corrected as shown below:

Column 3, line 40, replace "channel furthermore," with -- channel. Furthermore, --

Column 15, line 36, -- claim 4 should be cancelled --

Column 16, line 11, replace "staring" with -- storing --

Column 16, line 30, replace "input1output" with -- input/output --

Column 18, line 23, replace "chanaes" with -- changes --

Column 18, line 39, start a new line at "means for storing"

Signed and Sealed this

Seventh Day of August, 2007

JON W. DUDAS
*Director of the United States Patent and Trademark Office*